United States Patent [19]

Hirose et al.

[11] Patent Number: 4,794,528
[45] Date of Patent: Dec. 27, 1988

[54] PATTERN MATCHING METHOD FOR TREE STRUCTURED DATA

[75] Inventors: Tadashi Hirose, Komae; Kazuo Nakao, Sagamihara; Kousuke Sakoda, Hino; Youichi Takeuchi, Yokohama, all of Japan

[73] Assignee: Hitachi, Ltd., Tokyo, Japan

[21] Appl. No.: 15,111

[22] Filed: Feb. 17, 1987

[30] Foreign Application Priority Data

Feb. 21, 1986 [JP] Japan .................................. 61-35142

[51] Int. Cl.$^4$ ............................................... G06F 1/00
[52] U.S. Cl. .................................................... 364/300
[58] Field of Search ........................ 364/200, 300, 900

[56] References Cited

U.S. PATENT DOCUMENTS

4,583,164 4/1986 Tolle ............................... 364/300 X

Primary Examiner—Raulfe B. Zache
Attorney, Agent, or Firm—Antonelli, Terry & Wands

[57] ABSTRACT

In order to highly speed up the pattern matching of tree structured data in a logic programming language, the priority order is set when the data owned by the individual nodes of a tree structure are to be transversely sought, and the tree structured data are expressed in a vector type, in which they are arranged in that priority order, so that they are compared consecutively from the head for each element of the vector.

5 Claims, 11 Drawing Sheets

| F | 2 |
| A | f |
| R | · |
| A | d |

| F | 3 |
| A | g |
| A | a |
| A | b |
| A | c |

FIG. 13

| V | · |

| 1 | 1 | f |
| 0 | 1 | g |
| 0 | 0 | d |
| 1 | 0 | a |
| 1 | 0 | b |
| 1 | 0 | c |

PATTERN MATCHING METHOD FOR TREE STRUCTURED DATA

BACKGROUND OF THE INVENTION

The present invention relates to a method of expressing and processing tree structured data of a computer system and, more particularly, to a processing method appropriate for pattern matching.

The matching technique of tree structured data will be inspected in the following. The "tree structured data" is herein termed the data which is constructed of nodes having their own values and an arbitrary number (including zero) of child nodes. However, it is assumed that the node relation contains no loop. It takes place in case the node relations (which will be called the "structure") are identical and in case the values of the individual nodes satisfy a coincidence judging condition that two tree structured data can be matched. The coincidence judging condition is termed a rule which is decided such that "a value "*" is deemed an arbitrary value whereas the others are deemed equal only to an identical value".

One example of the tree structured data is shown in FIG. 1. According to the above-specified coincidence judging condition, the tree structured data (a) of FIG. 1 cannot be pattern-matched with those (b) and (c) of FIG. 1. This is because the data (a) and (b) are different in structure whereas the data (a) and (c) are uncoincided at the values of the third nodes of the third levels. The data structures (a) and (d) of FIG. 1 can be matched.

Figure 1A:
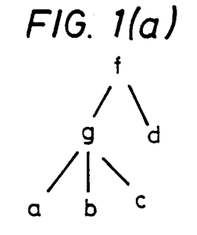
FIGS. 1a, 1b, 1c and 1d are a diagram showing one example of the tree structured data.
Figure 1B:
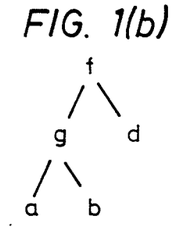
Figure 1C:
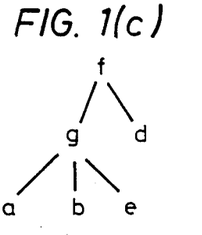
Figure 1D:
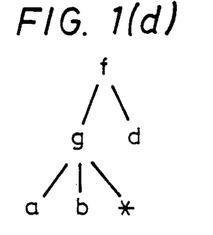
Figure 2:
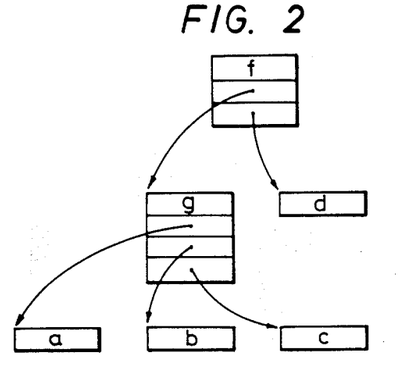
FIG. 2 is a diagram showing one example of the data expression of the prior art.

In a representative method of expressing the physical data of the tree structured data according to the prior art, as shown in FIG. 2, a node having child nodes is expressed by an (n+1)) number of series cells, of which the first cell is stored with the value of the node itsel and the second and following cells are stored with pointers to the child node cells. Thus, the physical data expression of the tree structured data using the pointers will be called the "record type expression". FIG. 2 shows an example of the physical expression of the tree structured data of FIG. 1(a) using that method.

This expression method cannot be said to be appropriate for the aforementioned pattern matching processing. Since the nodes are coupled by the pointers, the nodes to be inspected must have their addresses temporarily avoided so that all of them may be sequentially inspected. Considering the inspection of propriety of matching two tree structured data by the breadth-first search, the addresses of all the nodes located at an equal depth have to be avoided when the individual depths of the tree structures are to be inspected. In other words, the record type expression of the prior art is inferior in the matching processing efficiency.

SUMMARY OF THE INVENTION

An object of the present invention is to provide a physical data expressing method and a matching processing method for tree structured data, which methods can efficiently execute the aforementioned matching processing.

For achieving this object, the data expression of vector type is adopted, in which the individual node information on tree structured data is arranged in advance in the order to be used in the matching processing, namely, the data of the individual nodes are arranged in the order to be used for breadth-firstly searching the tree srructures. This expression will be called the "vector type expression". As a result, the address avoidance in the conventional method can be dispensed with so that the pattern matching can be conducted merely by judging the coincidence condition of the two vector expressions consecutively from the head cell.

DESCRIPTION OF THE PREFERRED EMBODIMENTS

First of all, the principle of the present invention will be described in the following.

The subject in the tree structured data expression of the vector type is how efficiently the positional information on individual nodes of the whole tree structure is expressed.

Figure 3:
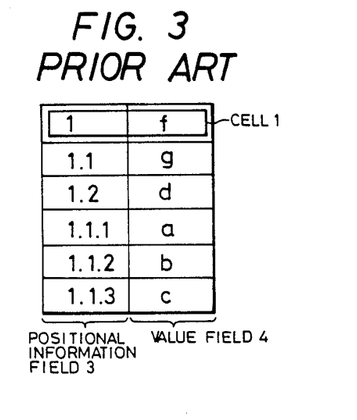
FIGS. 3, 4, 5a, 6a, 6b, 7a, and 7b, are diagrams showing examples of the data expression according to the method of the present invention.

According to the fundamental method, as shown in FIG. 3, a cell 1 indicating one node is constructed of two fields, i.e., a positional information field 3 and a value field 4, and the positional information field 3 is stored with a numerical value indicating a relative position relating to the highest node. In this method, however, the size of the expressable tree structure depends upon that of the poiitional information field 3. From the standpoint of the processing efficiency, the size of the field is desired to be fixed. Therefore, the present method has its memory efficiency reduced substantially to a very low level or its expressable tree structure size limited and is not practical.

The present invention has succeeded in solving the above-specified problem not by causing the information given to the positional information field of the cell expressing each node to indicate the positional relation between the highest node and the node under consideration but by storing only the information indicating the relation with a node (e.g., a parent node, a sibling node or a child node) existing around the node under consideration.

Figure 4:
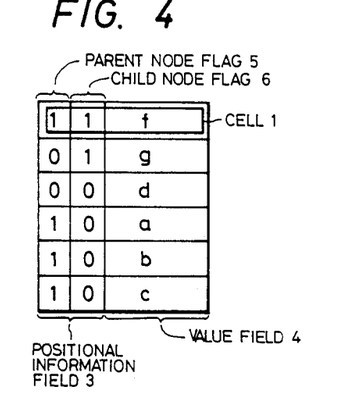

FIG. 4 shows one example of the physical data expression to be used in the present invention. The positional information field 3 is stored with two pieces of flag informatoon called a parent node flag 5 and a child node flag 6. The parent node flag 5 is a flag expressing whether or not the node expressed by the cell under consideration has the same parent node as the node expressed by the cell preceding by one. In the case of the same aarent node, the same value as that of the parent node flag 5 of the preceding cell is set. The child node flag 6 expresses whether or not the node expressed by the cell under consideration has a child node, and is set at "1"if YES and at "0"if NO.

Figure 5A:
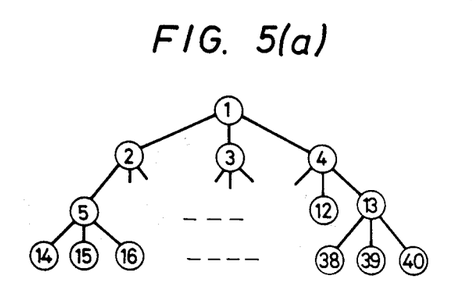
Figure 5B:
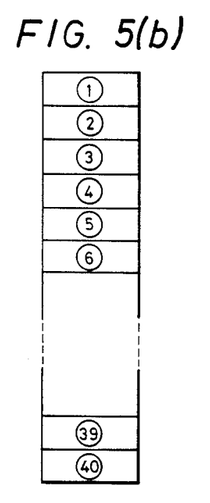
Figure 6A:
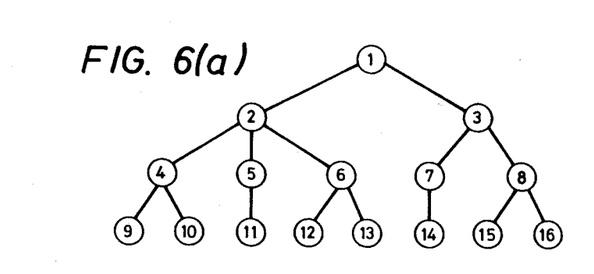
Figure 6B:
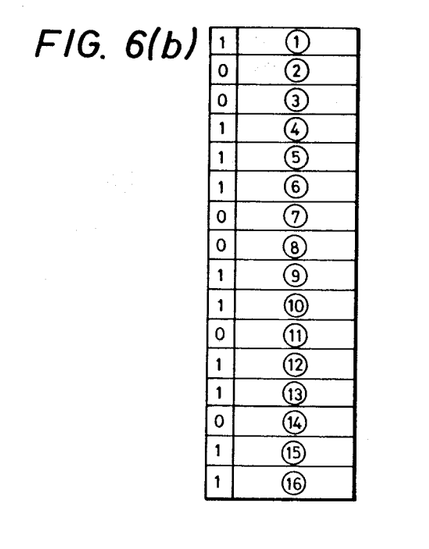
Figure 7A:
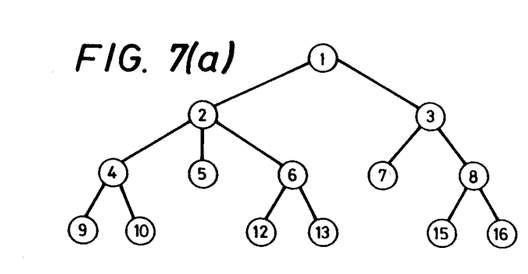
Figure 7B:
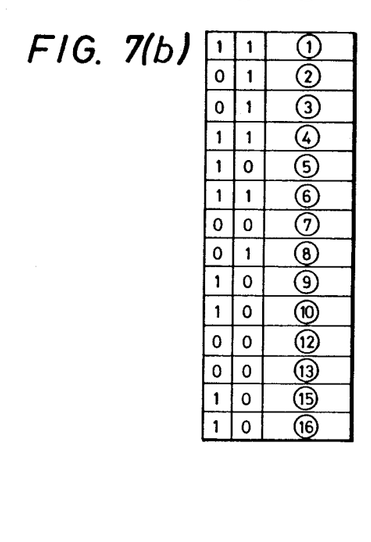

With reference to FIGS. 5 to 7, the concept of the present invention and the actions of the parent node flag 5 and the child node flag 6 will be described.

An n-ary tree structure having a predetermined n number of child nodes except the lowest node will be herein called the "complete n-adic tree structure". The lowest node is a node having no child node. If the tree structure is the complete n-adic tree structure which has an equal depth, namely, in which the depths of 11 the lowest nodes are equal, the positional information field 3 of each cell can be dispensed with. Since the cell arranging order is transversely dominant, the cell in the same position from the head of the vector type expression expresses the node which is always in a constant position in the tree structure. FIG. 5(a) shows an example of the complete ternary tree structure having a depth 4. FIG. 5(b) shows an example of the vector type expression of that tree structure. It is quite natural that the tree structure to be actually handled does not have such constant type. The general n-adic tree structure can also be converted into the complete n-adic tree structure having an equal depth by adding a dummy node but requires a cell for the dummy node so that it is not practical from the standpoint of the memory efficiency.

The parent node flag 5 of the present invention indicates whether or not the same parent node as the node of the cell preceding the cell 1 under consideration by one node is owned. For example, one bit is prepared as the parent node flag for the positional information field 3 of each cell so that the same value is given in case the same parent as that of the cell preceding by one is owned and othrrwise a different value is given. The n-adic tree structure having an equal depth can be expressed in vectors with a high memory efficiency merely by introducing the parent node flag 5, i.e., by giving the 1-bit positional information to each cell. FIG. 6(a) shows an example of the n-adic tree structure having the depth 4. FIG. 6(b) shows an example of the vector type expression in which the parent node flag 5 is introduced into the positional information field 3.

The child node flag 6 of the present invention indicates whether or not the node coreesponding to the cell under consideration has a child node. An n-adic tree structure having an irregular depth, i.e., a general n-adic tree structure can also be expressed in vectors with a high memory efficiency by giving that child node flag 6 in addition to the parent node flag to the positional information field 3. FIG. 7(a) shows an example of the general n-adic tree structure, and FIG. 7(b) shows a corresponding example of the vector type expression into which the parent node flag 5 and the child node flag 6 are introduced.

If each of two tree structured data is converted in the vector type expression when they are to be subjected to a pattern matching, this pattern matching can be conducted yy performing a coincidence judgement including the positional information field in the order from the head cell of each vector. If the tree structure is uncoincided, the values (i.e., the parent node flag 5 and the child node flag 6) of the positinnal information field are uncoincided.

The present invention will be described in the following with reference to FIGS. 8 to 17 in connection with one embodiment thereof in a case where it is applied to a subset system of the logic programming language processing system.

Figure 8:
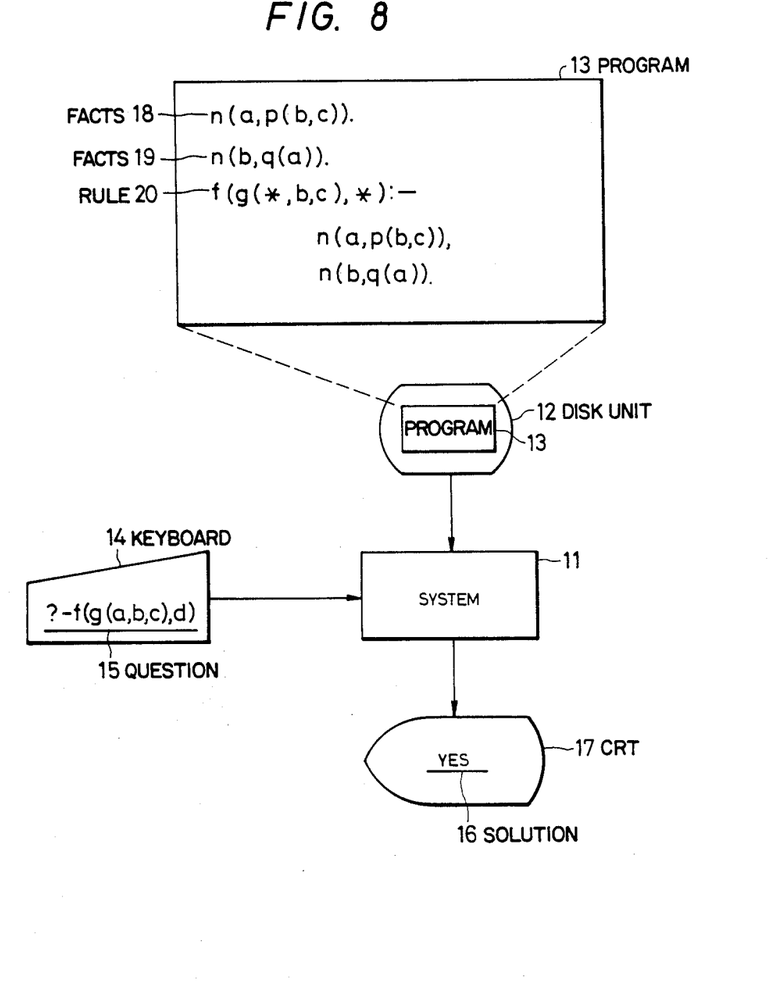
FIGS. 8, 9 and 10 are block diagrams showing one example of input and output data, a hardware structure and a software structure of the system embodying the present invention, respectively.

FIG. 8 is a block diagram showing one embodiment of the subset system according to the present invention. A system 11 reads in a program 13 stored on a disc unit 12 and outputs a solution ("yes" or "no") 16 to a question 15 inputted from a keyboard unit 14 to a CRT display unit 17.

The program 13 is constructed of arbitrary numbers of facts and rules. FIG. 8 shows two facts 18 and 19 and one rule 20. Each fact is composed of one tree structured data, and the rule is composed of a plurality of tree structured data. The tree structured data located on the lefthand side of a symbol ":-" is called the "head term", and the tree structured data divided by "," and arranged at the righthand side of the same symbol is called the "body term". The fact expresses that the tree structured data capable of pattern-matching therewith are "true". The rule expresses that the tree structured data capable of pattern-matching with the head term thereof are "true" if all the body terms are "true".

The system 11 examines whether or not the tree structured data inputted as the question are "true", and outputs "yes" as the solution 16 to the display 17 if "true" and otherwise "no".

The value of the root node of the eead term of a fact or rule will be called the "sentence name". Here, for brevity of description, it is assumed that a fact and a rule having an identical sentence name do not exist and that a rule having an identical sentence name is only one.

Figure 9:
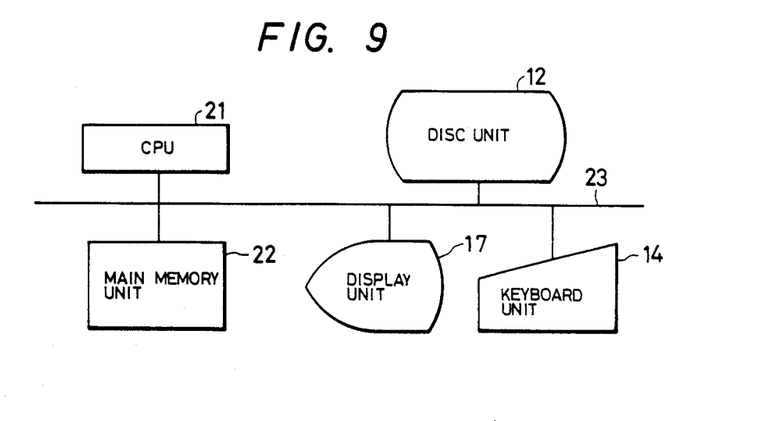

FIG. 9 shows the hardware structure of one embodiment of the subset system according to the present invention. This system is constructed of a central processing unit (CPU) 21, a main memory unit 22, the disc unit 12, the CRT display unit 17 and the keyboard unit 14, all of which are coupled by a bus 23.

Figure 10:
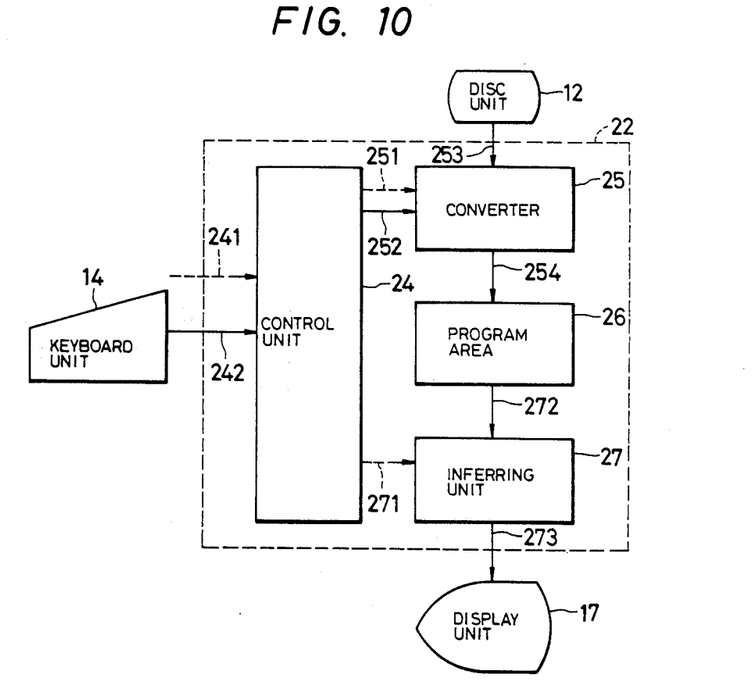

FIG. 10 shows a software structure to be stored in the main memory unit 22 of the embodiment of FIG. 9. This software is constructed of a control unit 24, a converter 25, a program area 26 and an inferring unit 27. In FIG. 10, broken arrows indicate flows of control, and solid arrows indicate flows of data.

The summary of the operations of the system of the embodiment will be described with reference to FIG. 10. The control unit 24 is started on a system starting instruction 241. In response to a question 242 inputted from the keyboard unit 14, the control unit 24 starts the converter 25 or the inferring unit 27 on a starting instruction 251 or 271. In case "read in ? - program" is inputted as a question 252, the control unit 24 sends this question 252 to the converter 25 to start it only. In case another question is inputted, the control unit 24 starts the inferring unit 27, too, after the aforementioned operations.

The converter 25 converts a program 253, which is stored in the disc unit 12, in case the question 252 sent from the control unit is the "read in ? - program", and otherwise the question itself into a later-described vector type expression 254, which is stored in the program area 26.

The inferring unit 27 seeks a solution with reference to the question and a program 272 which are stored in the program area 26, and outputs a result 273 to the CRT display unit 17.

Figure 11A:
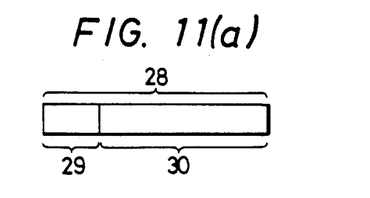
FIGS. 11a, 11b, 12 and 13 are diagrams showing the data expression rules used in the system of the embodiment.
Figure 11B:
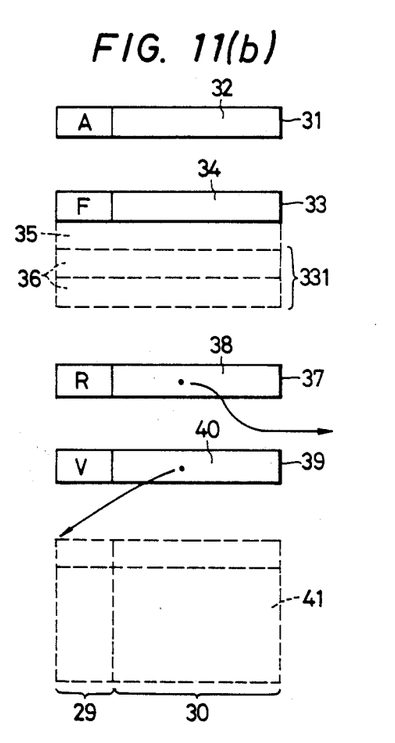

FIG. 11 shows a physical data expression type in the system. A cell 28 as the minimum unit of data operations is constructed of a 2-bit field 29 and a value field 30. This cell 28 is capable of expressing the present structure data in the two physical data expression types—the record type expression and the vector type expression. The field 29 is utilized as a tag field indicating the kind of the cell when in the record type expression and as the positional information field when in the vector type expression. When in the record type expression, it is discriminated through the tag field whether the cell under consideration is an "Atom cell" expressing the node having no child node, a "Functor cell" expressing the head of the cell expressing the not having the child node, a "Reference cell" indicating another cell, or a "Vector cell" indicating the vector type expression cell. FIG. 11(b) shows the structures of those cells. The "Atom cell" 31 has its value field 32 stored with a discriminator of a node name. The "Functor cell" 33 has its value field 34 stored with the number of child nodes owned by said node. That cell 33 is followed by a (the child node number +1) number of cells 331, on the head cell 35 of which is place the "Atom cell" indicating the name of said node. The cells 36 following the head cell 35 are cells expressing the child nodes. The "Reference cell" 37 is a cell referring to another cell and has its value field 38 stored with the address of another cell. The "Vector cell" 39 is a cell indicating the vector type expression cell and has its value field 40 stored with the address of the head cell of vector type expression cells 41. When in the vector type expression, the field 29 of the cell 41 is used as the positional information field, the actions of which have already been described in detail with reference to FIGS. 6 and 7 and accordingly are omitted here. At this time, incidentally, the value field 30 is stored with the discriminator of the node name like the "Atom cell" 31.

Figure 12:
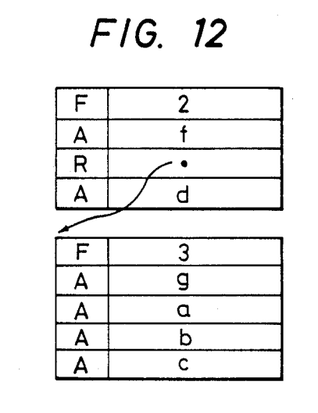
Figure 13:
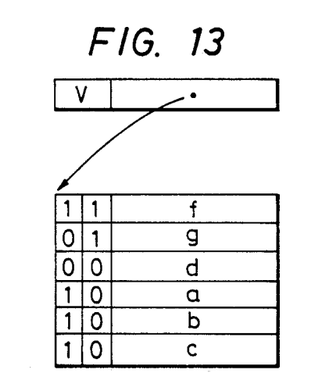

FIGS. 12 and 13 shows the cases in which the tree structured data shown in FIG. 1(a) are expressed in the record type expression and the vector type expression, respectively, by using the physical data expression rules.

Figure 14:
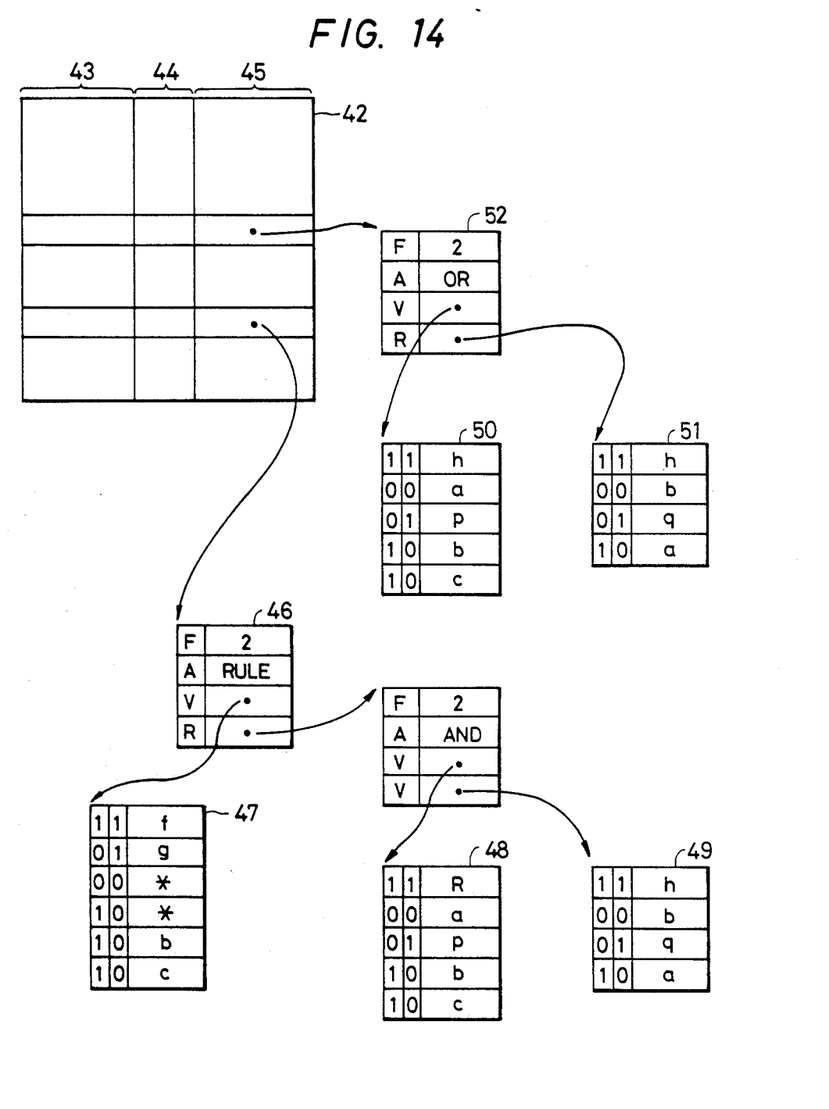
FIGS. 14, 15, 16 and 19 are diagrams showing the table structure of the system of the embodiment.
Figure 15:
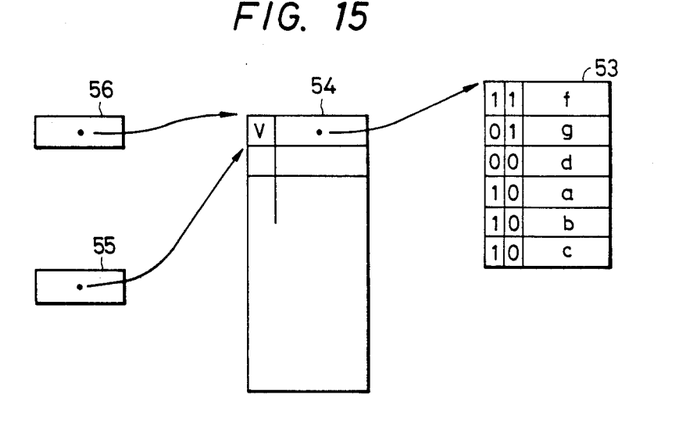

FIGS. 14 and 15 show the detailed structure of the program area 26.

FIG. 14 shows the data structure for storing the program. The facts and rules constructing the program area classified by the route node namde of the tree structured data indicating the facts and the route node name of the tree sructured data indicating the head term of the rules and are administered according to a name table 42. This name table 42 is constructed of a name field 43 for storing those names, a discrimination field 44 indicating whether they belong to the facts or rules, and an address field 45 indicating the address of the cell expressing the tree structured data of the facts and rules FIG. 14 shows the state in which the program shown in FIG. 8 is stored. The portions corresponding to the rule 20 of FIG. 8 are cells 46 and following numbers, and one head term and two body terms are converted into vector type expressions 47, 48 and 49. The facts 18 and 19 of FIG. 8 are converted into vector type expressions 50 and 51, respectively, and are stored. The facts are stored as the child nodes of the node having the name "or" because a plurality of facts having an identical name may be present. A cell 52 of FIG. 14 corresponds to that "or" node.

FIG. 15 shows a data structure for storing questions. These questions are converted into a vector type expression 53. The head address is stored in the head of a question stack 54. This stack 54 is constructed of a blank pointer indicating the blank head and an execution pointer 56 indicating the head of the question terms to be pattern-matched. FIG. 15 shows the state in which the vector type expression of the question of FIG. 8 is stored in the question stack 54 by the converter 25.

Figure 16:
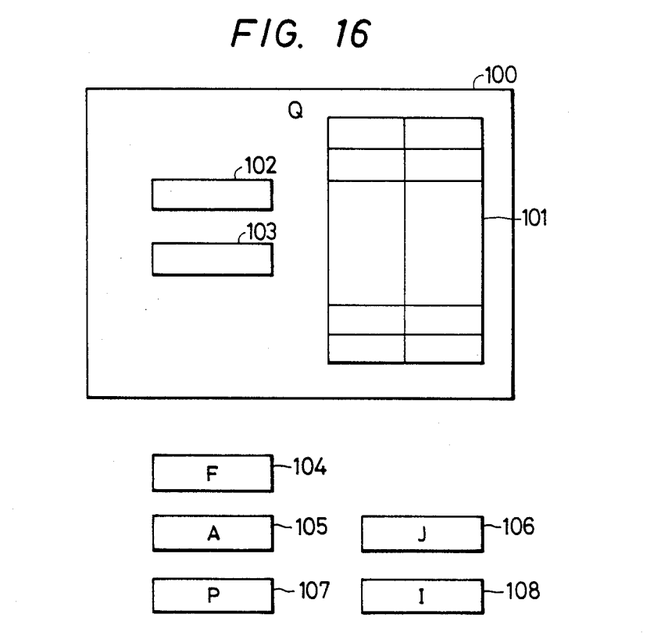
Figure 17:
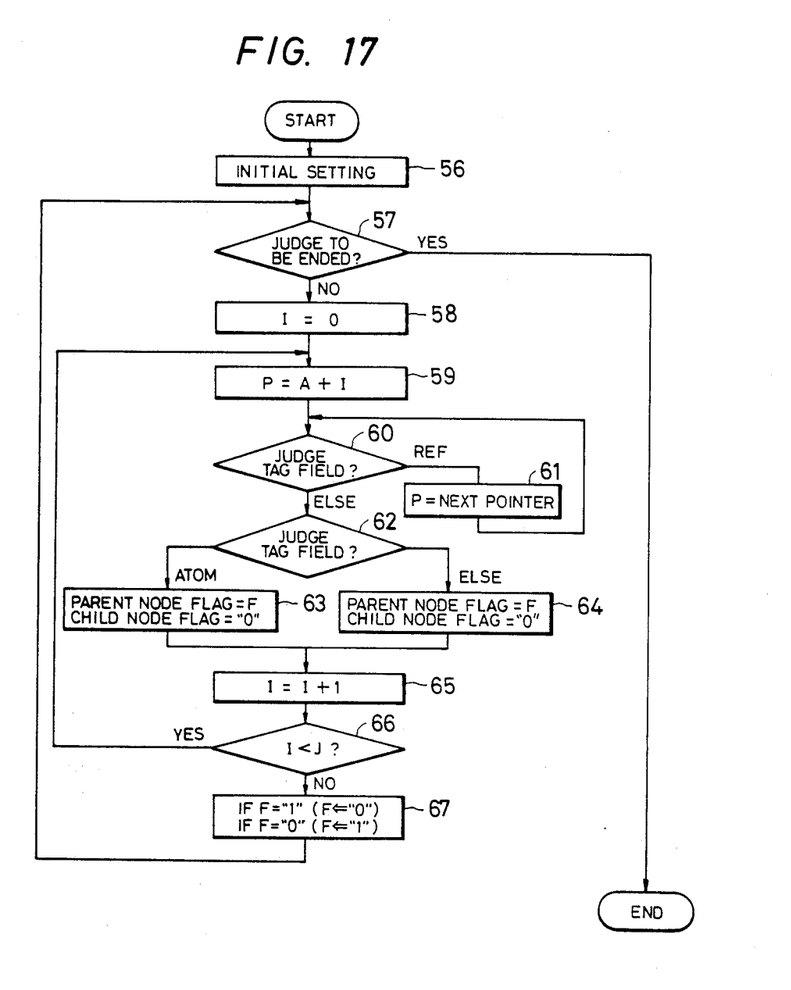
FIGS. 17 and 18 are flowcharts showing the proceuures of processing the central portion of the system of the embodiment.

Of the processings of the converter 25, the method of generating the vector type expression relating directly to the present invention will be described in the following. FIGS. 16 and 17 are flowcharts showing the operation areas and algorithm processing proeedures to be used for converting the tree structured data of the record type expression of the prior art into the vector type expression. sion.

The operation areas shown in FIG. 16 are composed of an FIFO order data storage area Q100 to be used for examining the individual nodes of the tree structured data of the record type expression according to transverse priority, a flag F104 for storing a parent node flag value, an address variable A105 for storing the head address of a group of cells in operation, a variable J106 indicating the number of argument of the grouped cells, an address variable P107 for storing the address of the cell in operation, and a counter variable I107 indicating what number of the aforementioned grouped cells the cell in operation belongs to. The FIFO order storage area Q100 is composed of a storage area 101 to be stored with a couple of the head address of the record type expression cell and the argument number, and a couple of pointers 102 and 103 indicating how far the storage area 101 is used.

The conversion algorithm from the record type expression into the vector type expression will be described with reference to FIG. 17.

Step 56

The FIFO order data storage area Q for storing intermediate data is provided, in which a couple of the head address of the record type expression cell to be converted and the argument number 1 is introduced. Then, the flag F is set at "1".

Step 57

One couple of the address and the argument number is extracted from the area Q and is set at the variables A and J. The processing is ended in case no address to be extracted is present in the area Q. Otherwise, the processing advances to Step 58.

Step 58

The counter variable I is set at zero.

Step 59

The address variable P is set at (A+I) (i.e., the address of the I-th cell from A).

Step 60

The tag field of the cell indicated by the address variable P is judged. The processing advances to Step 61 for the "Reference" and otherwise to Step 62.

Step 61

The address variable P is set with the value field of the "Reference" cell indicated by P, and the processing returns to Step 60.

Step 62

The tag field of the cell indicated by the address variable P is judged. The processing advances to Step 63 for the "Atom" cell and otherwise to Step 64.

Step 63

At the tail of the vector type expression cell being produced, there is produced a cell which has the value of the value field of the cell indicated by the addres variable P and has a parent node flag value F and a child node flag value "0". Then, the processing advances to Step 65.

Step 64

At the tail of the vector type expression cell being produced, there is produced a cell which has the value of the value field of the cell succeeding the cell indicated by the address variable P and has a patent node flag value F and a child node flag value "1". Moreover, the area Q is stored with the address of the cell preceding by two the cell indicated by the address variable P and the value (which is stored with the argument value) of the value field of the cell indicated by the address variable P. Then, the processing advances to Step 65.

Step 65

The counter variable I is augmented by 1.

Step 66

The processing returns to Step 59 if I<J and otherwise advances to Step 67.

Step 67

The value of the F is inverted. Specifically, the F is set at "0" if F="1" and at "1" if F="0". Then, the processing returns to Step 57.

The inferring unit 27 uses the question stack 54 in the program area 26 to seek a solution with reference to the program administered by the name table 42. This algorithm is described in the following with reference to the flow chart of FIG. 18.

Step 68

Figure 18:
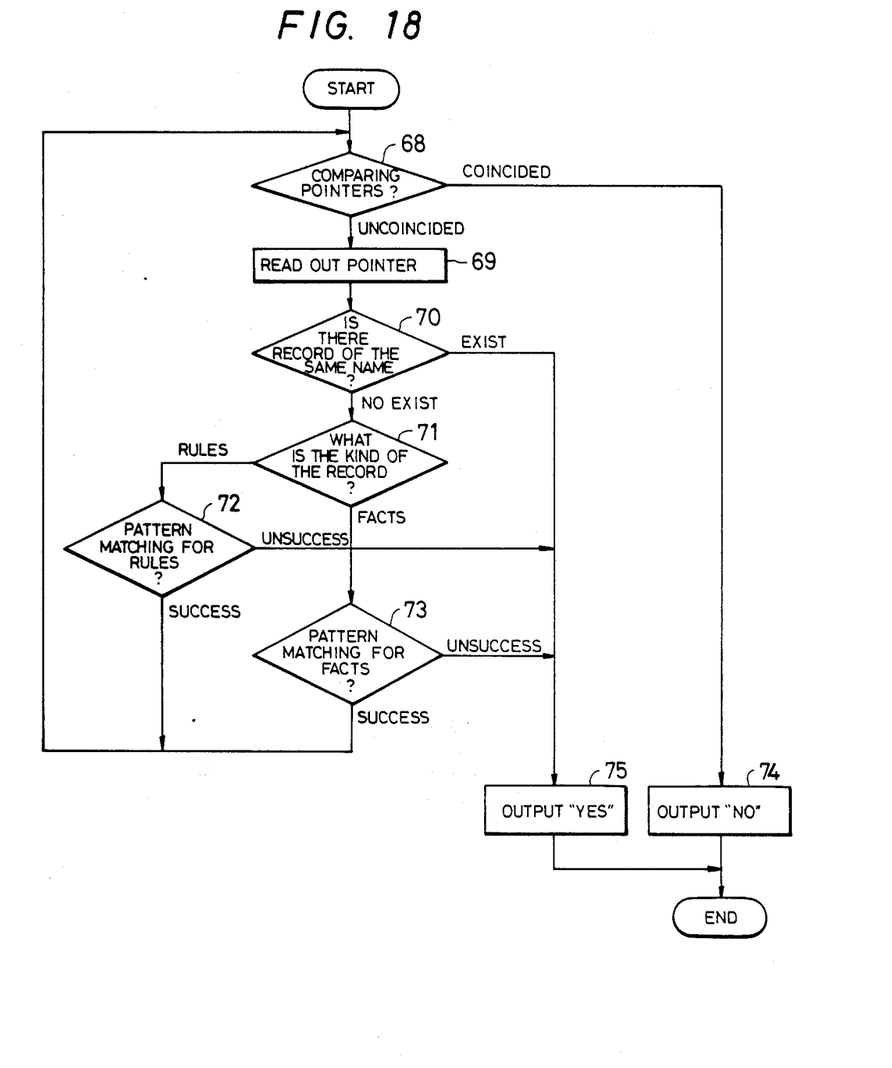

The execution pointer 56 and the blank pointer 55 are compared, and the processing advances to Step 74 if the two pointers are coincided and otherwise to Step 69.

Step 69

The content of the question stack indicated by the execution pointer 56 is extracted to the pointer variable P.

Step 70

The route node name of the tree structure expressed by the cell indicated by the pointer P is examined to seek the record in the name table 42 having the same name as that examined. The processing advances to Step 75 if the record exists and otherwise to Step 71.

Step 71

Whether the record (i.e., the current record) southt at Step 70 is a rule or a fact is examined by its discrimination field 44. The processing advances to Step 72 for the rule and to Step 73 for the fact.

Step 72

A pattern matching is conducted between the head term (in the vector type expression) of the rule indicated by the current record and the term (in the vector type expression) indicated by the pointer variable P. For a success, the addresses indicated by the body terms (in plurality) of the aforementioned rules are sequentially stored in and after the position of the blank pointer 55 of the question stack 54, and the processing returns to the step 68. For an unsuccess, the processing advances to Step 75.

Step 73

The facts (in plurality) indicated by the current record are sequentially subjected to the pattern-matching with the terms (both in the vector type expression) indicated the pointer variable P. Then, the processing advances to Step 75 for an unsuccess and otherwise returns to Step 68.

Step 74

The processing is ended by outputting "yes" as the solution.

Step 75

The processing is ended by outputting "no" as the solution.

Figure 19:
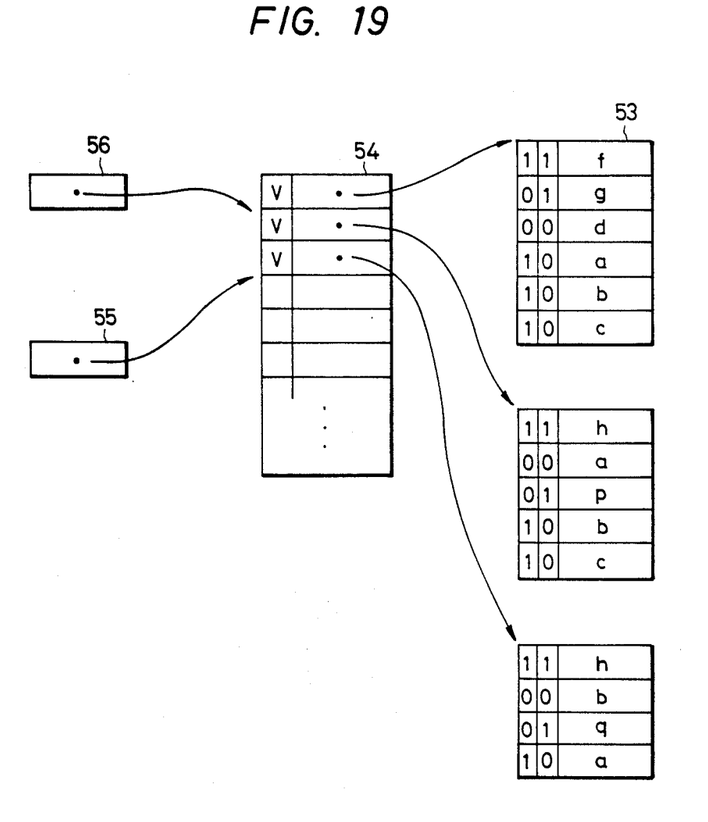

As has been described hereinbefore, the inferring unit 27 proceeds the processings by using the question stack 54. The state of the question stack when the question 20 of FIG. 8 is being executed is shown in FIG. 19.

In the system of the present embodiment, what is repeatedly executed is the inferring unit 27, of which the pattern matching processings of the tree structured data conducted especially at Steps 72 and 73 are repeated many times. As a result, those pattern matching processings form the major factor determining the system performance. If the tree structured data to be pattern-matched are expressed in the vector type according to the present invention, as has been described hereinbefore, the pattern matching processings can be conducted by the simple vector comparison algorithm oo that the system performance can be improved.

According to the present invention, a general n-adic tree structure having an arbitrary size can be expressed in the oneddimensional arrangement of the cell of the fixed length corresponding to the number of the nodes thereof, and the pattern matching of wwo n-adic tree structures can be conducted by the simple procedure in which those cells are extracted consecutively one by one from the head cell and are sequentially compared. Therefore, the present invention can provide an effect that the pattern-matching processings of the tree structured data can be highly speeded up.

What is claimed is:

1. A pattern matching method of tree structured data, comprising the steps of: converting n-ary tree structured data into a vector expression by arranging, in order of priority of transverse search in a tree structure, cells corresponding to memory elements of a constant length, which are constructed of a positional field for storing positional information on a whole tree structure occupied by each composing said tree structured data and a value field for storing a value of each of said nodes to be processed in a computer system; and comparing said cells, which are converted into said vector expression, consecutively from a beginning position.

2. A pattern matching method according to claim 1, wherein said positional field information includes parent node flag information indicating whether or not a particular cell has an identical parent node.

3. A pattern matching method according to claim 2, wherein said parent node flag information contains a child node flag information indicating existence of a child node.

4. A pattern matching method according to claim 2, wherein flags under consideration of adjacent cells corresponding to nodes having an identical parent node flag information are set at an identical value and flags under consideration of adjacent cells corresponding to nodes having different parent node flag information are set at different values.

5. A pattern matching method according to claim 4, wherein said parent node flag information is expressed by a 1-bit flag.

* * * * *